United States Patent [19]
Smetana et al.

[11] Patent Number: 5,356,446
[45] Date of Patent: Oct. 18, 1994

[54] LOW DENSITY INSULATING AND FIRE-RESISTANT PERLITE CONCRETE

[76] Inventors: David A. Smetana, 2159 N. St. James Pkwy., Cleveland Heights, Ohio 44125; Alfonzo L. Wilson, 3661 Langton Rd., Cleveland Heights, Ohio 44121; Richard J. Lenczewski, 12509 Oakview Blvd., Garfield Heights, Ohio 44125; Said Dimitry, 20650 Fairmount Blvd., Apt. 4D, Shaker Heights, Ohio 44118

[21] Appl. No.: 87,983
[22] Filed: Jul. 7, 1993
[51] Int. Cl.⁵ ............... E04B 2/00; E04F 15/22
[52] U.S. Cl. .................. 52/743; 52/741.4; 52/404.1; 52/406.3; 52/406.1; 252/378 R; 106/675
[58] Field of Search ........... 52/404.1, 404.3, 406.1, 52/406.3, 743, 741.4; 252/378 R, 378; 106/675, 714

[56] References Cited
U.S. PATENT DOCUMENTS

| | | | |
|---|---|---|---|
| 2,252,578 | 8/1941 | Powell | 52/743 |
| 3,798,867 | 3/1974 | Starling | 52/743 |
| 3,922,413 | 11/1975 | Reineman | 428/119 |
| 4,399,645 | 8/1983 | Murphy et al. | 52/743 |
| 4,884,381 | 12/1985 | Betti | 52/741.4 |

*Primary Examiner*—Gary P. Straub
*Attorney, Agent, or Firm*—Pearne, Gordon, McCoy & Granger

[57] ABSTRACT

The present invention relates to a method of providing thermal insulation and fire-resistance to buildings, by filling voids or spaces in and around structural members with a low density thermally insulating and fire-resistant cementitious composition containing a high proportion of a relatively smooth-surfaced, vesicular, expanded perlite. The method includes placing a flexible, woven, fire-resistant bag in the space to be filled, so as to act as a containment vessel, pumping a cementitious composition into the bag to fill a space by conforming to the shape of the space, while the bag simultaneously contains the cementitious composition in the desired position, and allowing the composition to cure into a lightweight, fire-resistant, and thermally insulating concrete. The method is particularly useful in and directed to remedial, post-construction applications in occupied buildings.

14 Claims, 4 Drawing Sheets

LOW DENSITY INSULATING AND FIRE-RESISTANT PERLITE CONCRETE

BACKGROUND OF THE INVENTION

The present invention relates to a composition for and a method of providing thermal insulation and fire-resistance to buildings by filling voids or spaces in and around structural members with a low density thermally insulating and fire-resistant cementitious composition containing a high proportion of a relatively smooth-surfaced, vesicular, expanded perlite, referred to hereinafter simply as "expanded perlite". The method includes using at least one flexible, woven, fire-resistant bag as a containment vessel which allows the novel cementitious composition to fill the space by conforming itself and the containment bag to the shape of the space while simultaneously containing the cementitious composition in the desired position until it is cured. The method is particularly directed to remedial, post-construction applications in occupied buildings.

In prior fire-proofing or fire-safing compositions, simultaneously obtaining strength, light weight and fire resistance has been particularly difficult, since known lightweight fire-resistant materials are generally very soft and easily broken apart.

In prior cementitious compositions, it has been very difficult to obtain good resistance to high heat in any concrete or cementitious composition. It has been difficult to obtain a strong and light weight concrete.

OBJECTS OF THE INVENTION

It is an object of this invention to provide a method of remedially applying the fluid cementitious composition by pumping it into a flexible bag placed in voids or spaces in structural members of buildings, and forming a concrete plug to fill the voids or spaces, particularly where such spaces allow or support a flux of air, heat or flame.

It is a further object of this invention to provide a method of remedially applying the composition in an existing building, particularly where the building has been found to be deficient in the attributes to which the invention is directed, in an economical, simple procedure which avoids untoward disruption of normal building activities.

It is a further object of this invention to provide a cementitious composition, comprising a relatively high proportion of expanded perlite, ordinary portland cement, pozzolans and admixtures. The cementitious composition is lightweight, pumpable, and workable in place prior to curing. After curing, the concrete formed by the cementitious composition is lightweight, relatively strong in compression, fire-resistant and thermally insulating.

Other objects and advantages will become apparent from the following description of the invention.

SUMMARY OF THE INVENTION

In accordance with our invention we provide a cementitious composition containing a substantial portion of a relatively smooth-surfaced, vesicular, expanded perlite, the composition being lightweight, pumpable and fluid prior to curing, and thermally insulating and fire resistant after curing. The composition and resulting concrete have a low density and are substantially fireproof due to inclusion of the expanded perlite in the composition. The expanded perlite aids in pumping the mixture into place, and helps avoid concerns of excessive supra-design weight when the method of the invention is applied to existing buildings. The composition of the invention forms a fire-resistant thermal insulation which has excellent exterior durability, including the qualities of water resistance, freeze-thaw cycle resistance, good structural integrity, strength and light weight, while being relatively simple to install remedially. The expanded perlite allows the resulting concrete to be relatively strong in compression, preferably having a 28-day strength of approximately 700 psi.

The concrete plug formed on curing provides the benefits of both thermal insulation and fire-resistance to the structural members and the building, while having a relatively low density.

A flexible, conformable containment bag is used as a container for the composition according to the invention. The bag is capable of conforming to the shape of the structural member to be filled and of conforming to and around objects projecting into the space, is slightly permeable to the fluid cementitious composition, is capable of expanding to allow the composition to substantially fill the entire space to be filled, and does not support combustion.

Further in accordance with our invention, we provide a method for remedially fire-proofing spaces in and around structural components of a building. The preferred method includes the steps of (1) forming the pumpable, fluid, lightweight cementitious composition which includes a high proportion of a relatively smooth-surfaced, vesicular, expanded perlite, (2) placing the flexible, woven, nonflammable bag into the void or space to be filled, (3) pumping or flowing by gravity the cementitious composition into the bag until the space confining or defined by the bag is substantially filled, and (4) pumping or flowing by gravity the same composition over the top of the filled bag. During pumping the bag and the contained composition are pressed outwardly due to the weight and flowability of the composition. When filled, the bag substantially fills all of the desired spaces, including small surface irregularities. The composition then cures, forming a solid but lightweight insulating and fire-resistant concrete plug filling the space. The expanded perlite in the cementitious composition provides the concrete plug with excellent insulating and heat-resisting properties, strength, durability and very low density.

The present method employing the cementitious composition is designed to take advantage of the outstanding properties of a concrete containing such expanded perlite. Due to the pumpability and light weight of the composition, it can be prepared in an area adjacent the building, but out of the way of normal building traffic, and then pumped to the location of use as needed. Alternatively, an entire prepared batch of the composition may be pumped to a holding container elevated above the location of use, and then allowed to flow to that location by gravity as needed.

An important benefit of the expanded perlite used in this method is that the perlite allows a significant weight reduction in the concrete formed by the composition, while obtaining a moderate design strength. The density of the cured concrete resulting from this composition is slightly less than the preferable wet density due to loss of water during curing. The preferred density range is from 35 to 65 pounds per cubic foot (480–1280 kg/m$^3$). The most preferred density is 45 pounds per cubic foot (720 kg/m³). The 28-day design strength in compression is preferably at least approximately 700 psi. Since weight is frequently an important consideration in selection of thermal insulation and fire-proofing materials the low density of the composition of the invention is of very great importance. Expanded perlite which has a smooth surface, a low density and a vesicular nature, combines together with the cement and other elements of the composition of the invention to provide lightweight strength with high resistance to both flow of heat and the destructive effects of high heat and fire.

DETAILED DESCRIPTION OF THE PREFERRED EMBODIMENT

Figure 1:
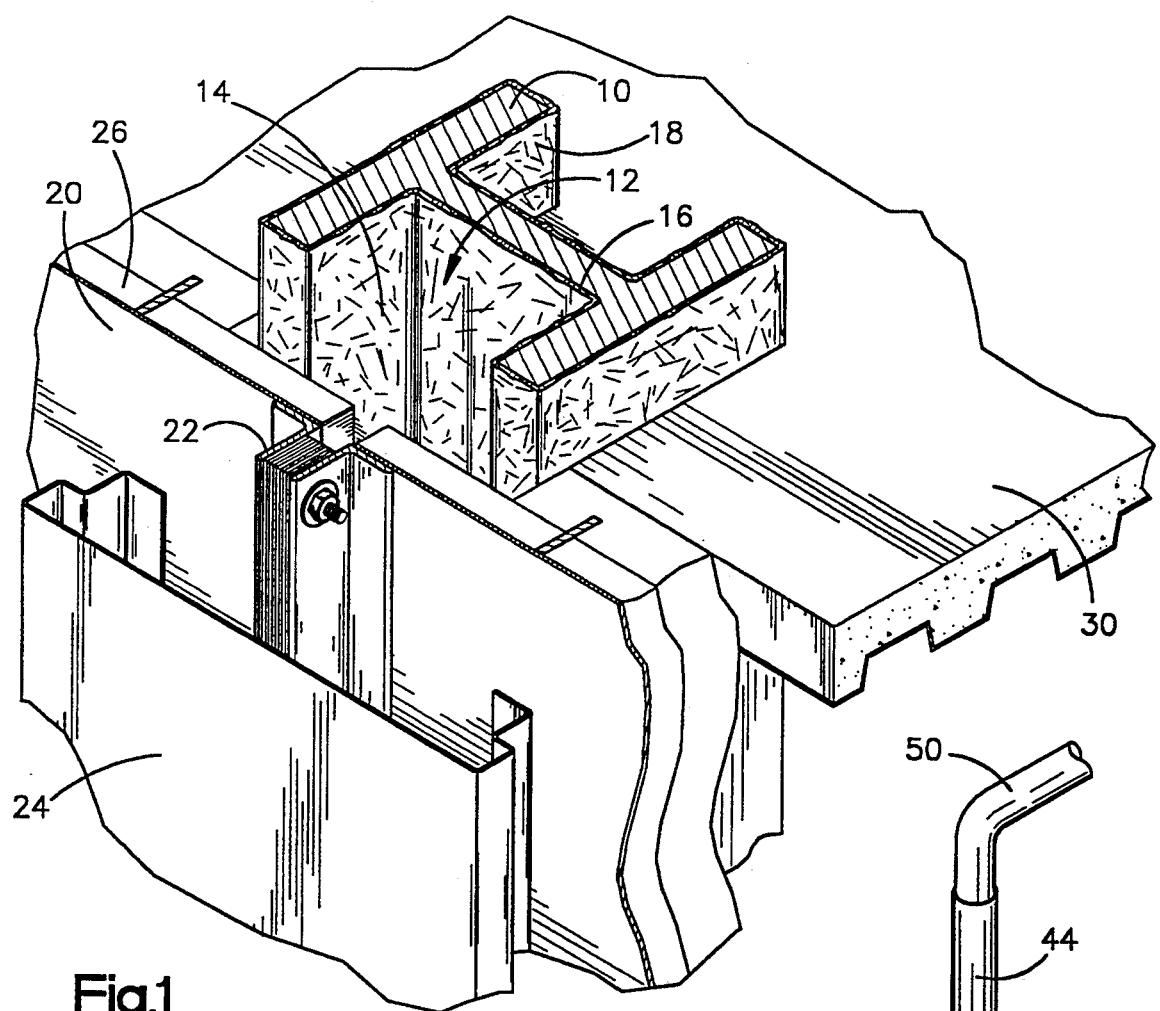
FIG. 1 is a perspective elevational view of a structural member in a building, with the outside wall partially cut away, prior to filling the space by the method of the present invention.
Figure 7:
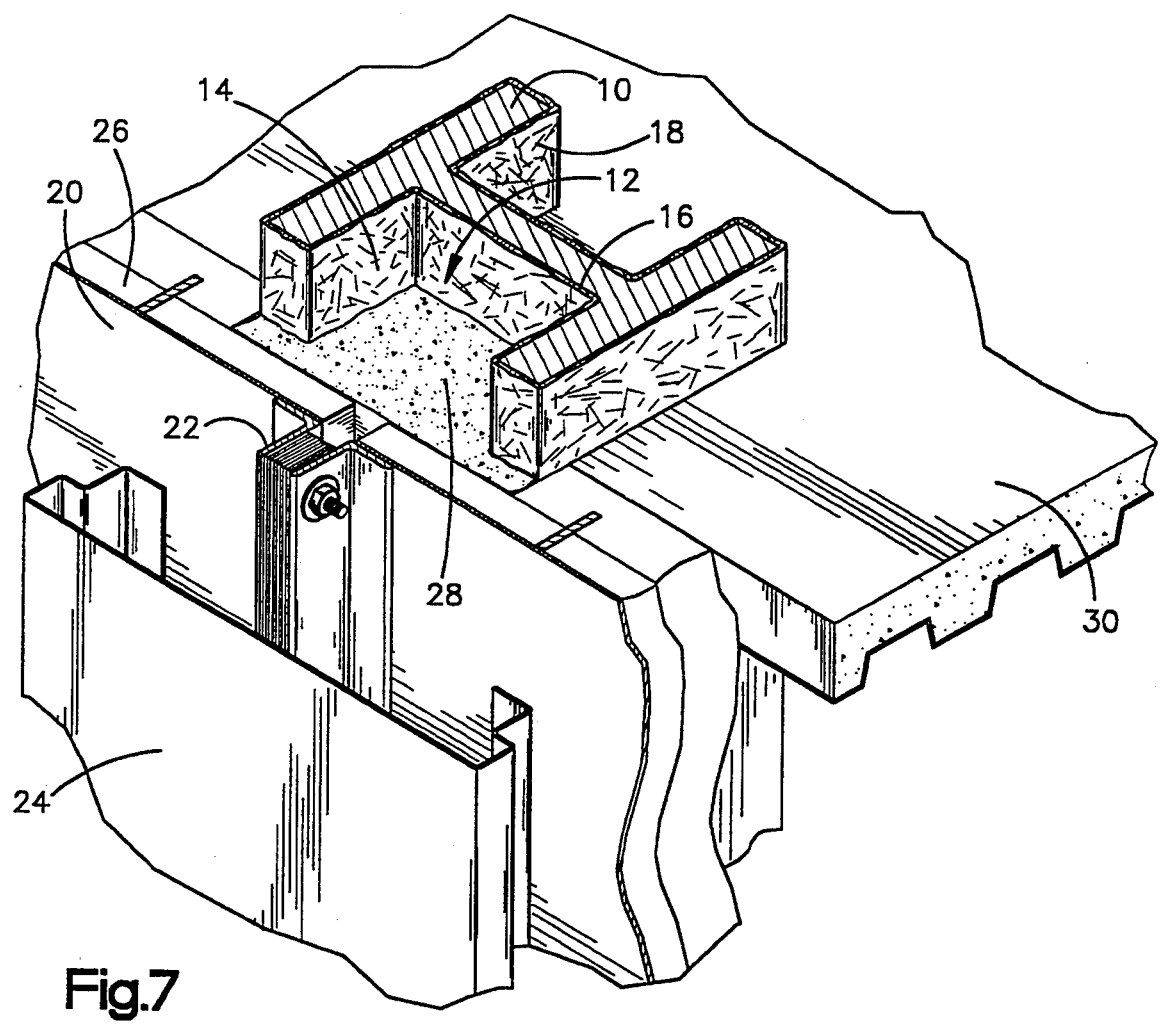
FIG. 7 is a perspective view of a structural member in a building, with the outside wall partially cut away, similar to FIG. 1, following filling the space by the method of the present invention.

Many modern buildings have a skeleton comprising steel structural members such as vertically mounted I-beams 10, with a steel curtain wall 20 forming an outer skin of the building, and poured concrete floors 30, as shown in FIGS. 1 and 7. The I-beam 10 has an open web 12, frequently oriented perpendicularly to the outer wall 20 of the building. This orientation frequently causes a space 14 to be created between the outer wall 20 and the I-beam web 12. The space 14, being directed outwardly, is generally empty, except for a coating of fire-retardant material 16 completely covering the I-beam 10.

As shown in FIG. 1, the poured concrete floor 30 contacts and substantially bonds to the I-beam 10 at both sides and web portion 18. The web portion 18 is on the opposite side of I-beam 10 from web 12, and is oriented toward the interior of the building. When the floor 30 is poured, the portion of the space 14 within the web adjacent the floor may not be filled with concrete. The I-beam 10 is positioned very close to the curtain wall 20, with a gap therebetween of approximately one inch (2.54 cm). Thus, the space 14 between the I-beam 10 and the outer wall 20 creates a conduit that can extend vertically from story to story, along the outer wall 20 of the building. The conduit may extend for three or more floors. The gap between I-beam 10 and outer wall 20 provides communication between the space or conduit 14 and other spaces behind interior walls, thus completing a connection between outside air leaking into the conduit and interior spaces of the building, and between spaces on one floor and other spaces on floors above and below it.

The space 14 extends vertically at least the length of the vertically mounted I-beams 10, usually several stories. The conduit naturally aspirates upward any air that seeps into it, and may in fact help create such seepages by maintaining a constant pressure differential between exterior and interior air spaces. Observations with a video camera have revealed a quite substantial velocity of upward flowing air in such conduits. The velocity may be sufficient to blow standard insulation out of its position within web 12. Such a conduit, even one which communicates between a limited number of floors, can create problems with ventilation and indoor temperature control and provide a conduit through which heat, fire and smoke can migrate from floor to floor in the event of a fire in the building.

When the interior walls (not shown) are mounted and finished, the columns or I-beams 10 are covered and no gap is visible from the interior of the building. However, if outside air penetrates the outer wall 20, and enters the conduit formed by the communicating webs 12 of the I-beams 10, this air, or in other cases heat, smoke or flames from a fire, may be allowed to penetrate behind the interior walls. Such penetration will inevitably have an affect on interior spaces of the buildings.

Figure 2:
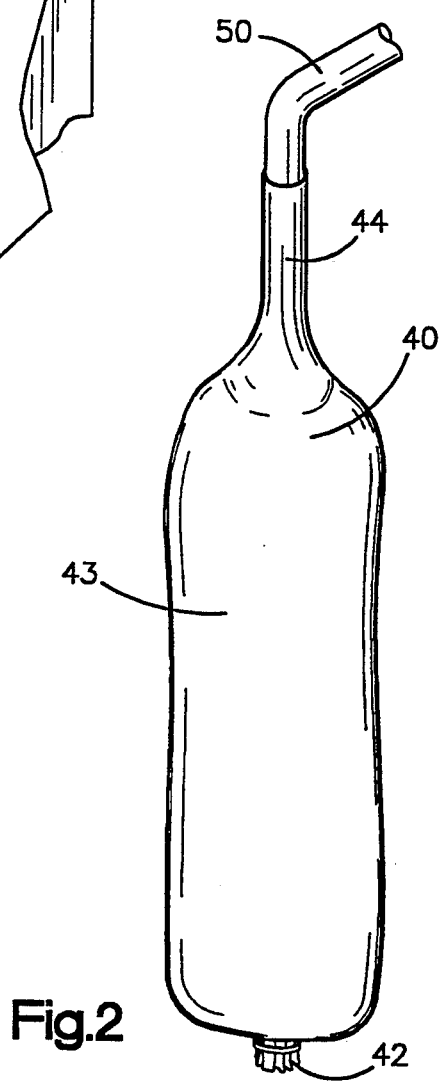
FIG. 2 is a perspective view of the flexible bag in accordance with the invention.

FIG. 2 shows a flexible, conformable containment bag 40 as used in the present invention. The flexible bag 40 may be composed of a suitable flexible material, including a woven fabric material or a continuous plastic or rubber material. In the preferred embodiment, the bag is made of a woven fibrous polyamide material, and is therefore flexible and expandable.

The bag material may be a geotextile material, which is non-flammable and will not support combustion, or it may be a polymeric material, in which case it is preferably chosen so as to not support combustion when used according to the present invention. If exposed to flame or high temperature, the geotextile material of bag 40 neither burns nor supports combustion.

The bag material is more preferably a nylon or similar polyamide-based material. If a bag made of polyamide is used as in the present method is exposed to a direct flame, it will be charred, but will not support combustion. The term "not support combustion" means that the material, if it burns or is charred at all when directly exposed to flame or intense heat, will not continue to burn once the flame or heat has been withdrawn. This property might also be referred to as self-extinguishing.

Figure 4:
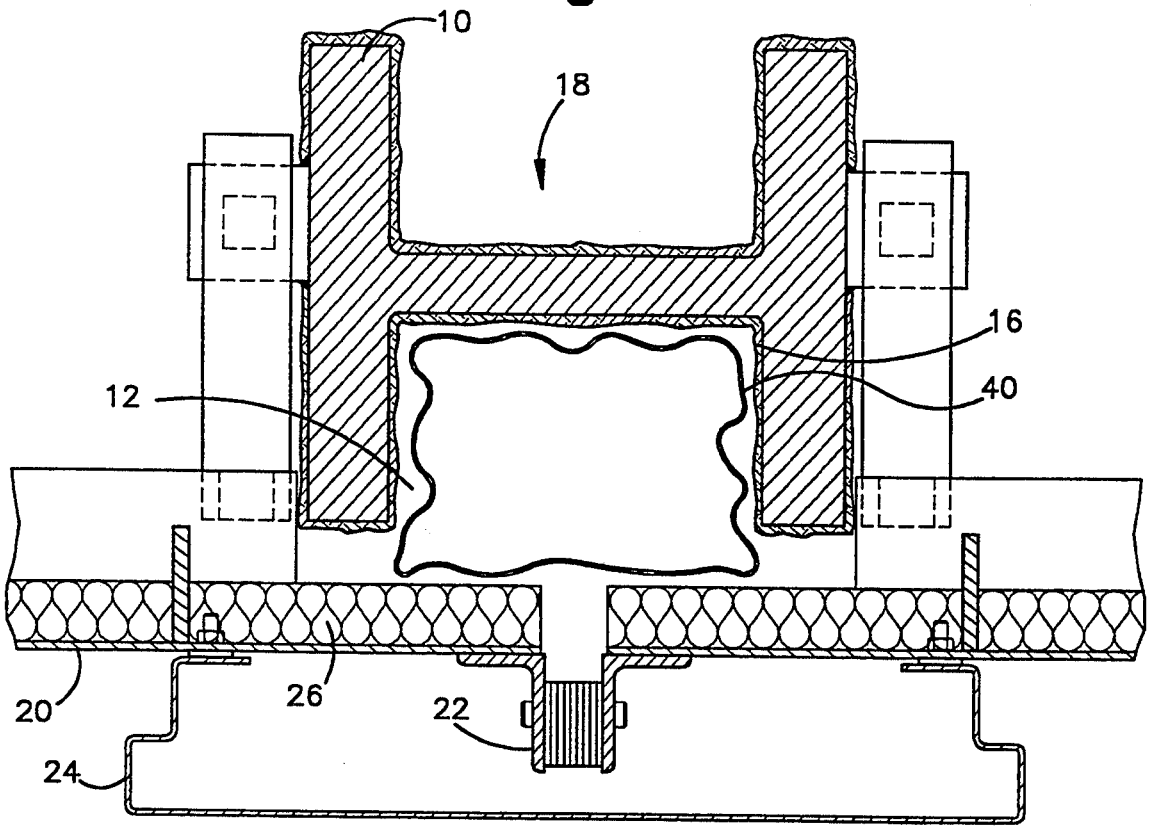
FIG. 4 is a sectional plan view of the I-beam of FIG. 1, similar to FIG. 3, with the flexible bag into the space to be filled according to the invention, but prior to filling the bag.

Bag 40 has a closed bottom 42 and a small diameter neck or snorkel 44 through which the cementitious composition is pumped to fill the bag. As shown in FIG. 4, the bag 40 has a main body section 43 extending approximately 75% of the total length, and the snorkel 44 extends the remaining length of the bag. The snorkel 44 will also be filled, during the process of filling the bag 40.

The bag used in the method of the present invention is made in the form of, and is referred to as, a sock. The flexible bag is preferably made of a continuous, multifilament yarn of which at least about 50% by weight is bulk textured, the remainder being smooth textured. The preferred bag material is heavy, having a denier of approximately 1900 in the fill direction and approximately 1260 in the warp direction. The most preferred sock is referred to as PJ-14, manufactured by Construction Techniques, Inc. of Calhoun Falls, S.C. The product of the present method is known by the trademark "FIRESOX" and is sold by Specrete-IP Incorporated of Cleveland, Ohio.

It should be recognized that when the sock or flexible bag is filled with the cementitious composition of the invention, that the fibers of the bag, being impregnated and surrounded by the cementitious composition prior to curing, will act as a strengthening reinforcement in the cured concrete.

In an alternative embodiment, the main body 43 of the sock may be substantially shorter than the snorkel portion 44. In this alternative embodiment, the concrete plug formed does not extend fully from one floor to the floor above, but instead is shorter, and serves the purpose of blocking the conduit rather than filling it. This alternative embodiment preferably would be installed at floor level, with portions of the plug extending above and below the concrete floor 30 at each floor level in the building. Such an embodiment might require additional means of support within the space 14.

Figure 3:
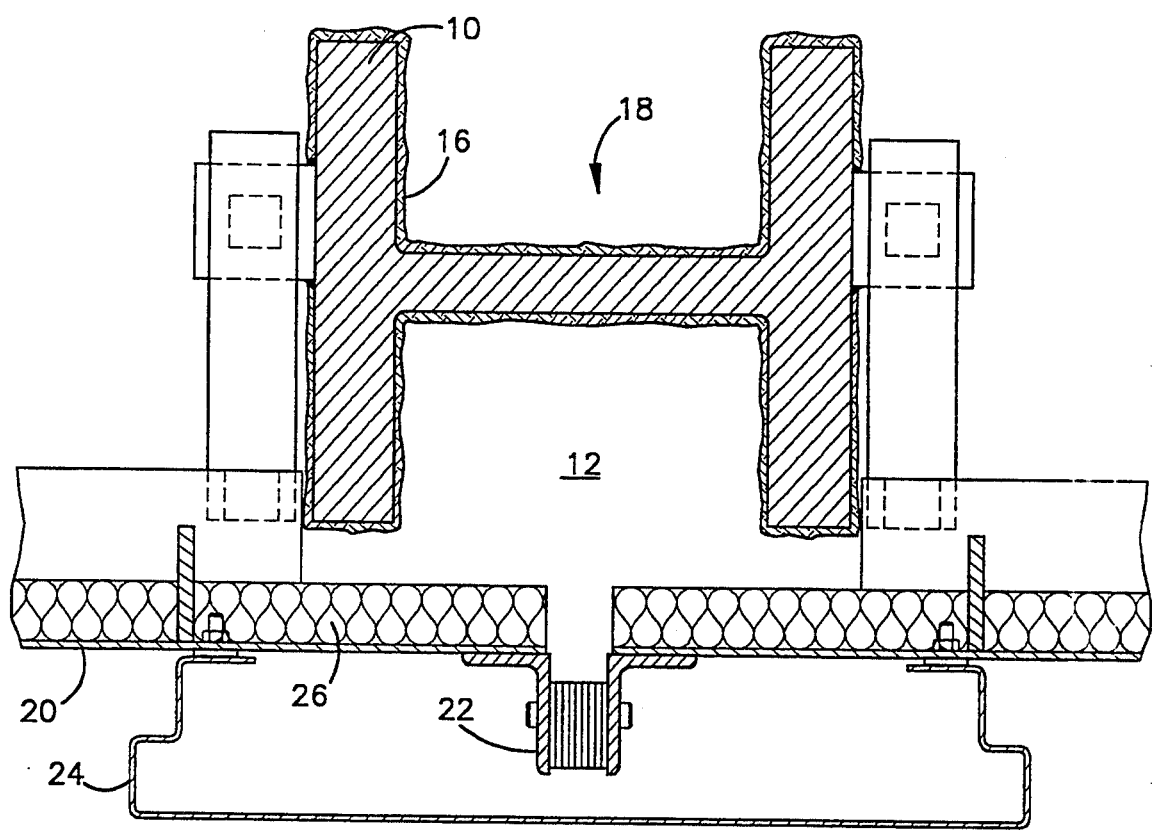
FIG. 3 is a sectional plan view of the I-beam of FIG. 1, prior to application of the composition in accordance with the method of the invention.

FIG. 3 is a cross-sectional view of a structural member in a building, as shown in FIG. 1, prior to application of the method according to the present invention. FIG. 3 also shows a knife edge flange joint 22 between portions of the outer wall 20. Joint 22 is covered and surrounded by column covers 24. Wall 20 has an inner surface covered with a layer of insulation 26.

The steel plates forming the curtain wall 20 are have inwardly extending flanges (not shown) welded to the I-beams 10 at approximately every third I-beam 10 moving horizontally along a single floor. These flanges provide a direct connection between the I-beam 10 and the curtain wall 20. In such cases a relatively short portion of the space or conduit 14 is vertically divided into two sections. Where these flanges are located in a space to be filled, the filling process must be adapted accordingly. The adaptation preferably comprises using two flexible bags, one on either side of the flange. Both bags are filled according to the method, thereby leaving no portion of the space 14 unfilled. In other situations, it might be necessary to use more than two flexible bags 40.

FIG. 4 is a cross sectional view similar to FIG. 3, showing the firesox flexible bag 40 after it has been pulled into position for filling, but prior to filling, according to the invention. The bag 40 has been pulled down into space 12 from the upper floor 30, by means of a pull wire attached at the bag bottom 42, until the bottom 42 just contacted the next lower floor. The snorkel 44 for filling the bag 40 is directed upwardly in the space 14.

Figure 5:
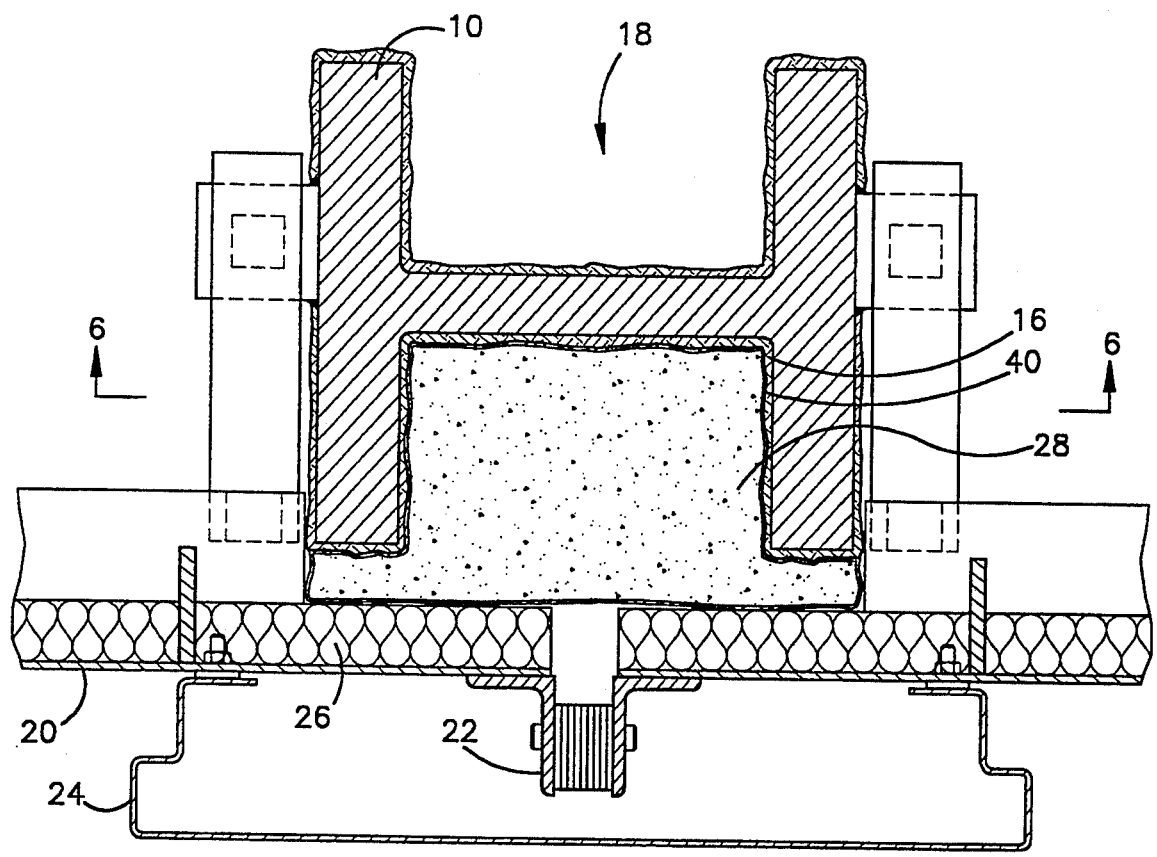
FIG. 5 is a sectional plan view of the I-beam as in FIGS. 3 and 4, following filling of the flexible bag with the cementitious composition by the method of the present invention.

FIG. 5 is a cross-sectional view, similar to FIGS. 3 and 4, following application of a cementitious composition by the method of the present invention. As shown in FIG. 5, the flexible bag 40 conforms to the surface of the pre-existing insulation 16. As also shown in FIG. 5, the flexible bag 40 and the composition contained therein expand during filling to entirely fill the available space between the I-bean 10 and the outer wall 20, including expanding laterally outward into the relatively narrow spaces between the outward ends of the I-beam 10 and the adjacent insulation 26.

As shown in FIGS. 1, 3, 4, and 5, sections of the outer wall 20 are held together by flange joints 22. The sections of the outer wall 20 are also known as stressed-steel plates. The flanges 22 are about four feet in length, and there is usually one flange on each floor. Both plate intersections between the flanges and the flanges 22 are covered by column covers 24, which extend vertically on the outer walls 20 of the building. Not all I-beams 10 have an adjacent, associated flange 22.

Figure 6:
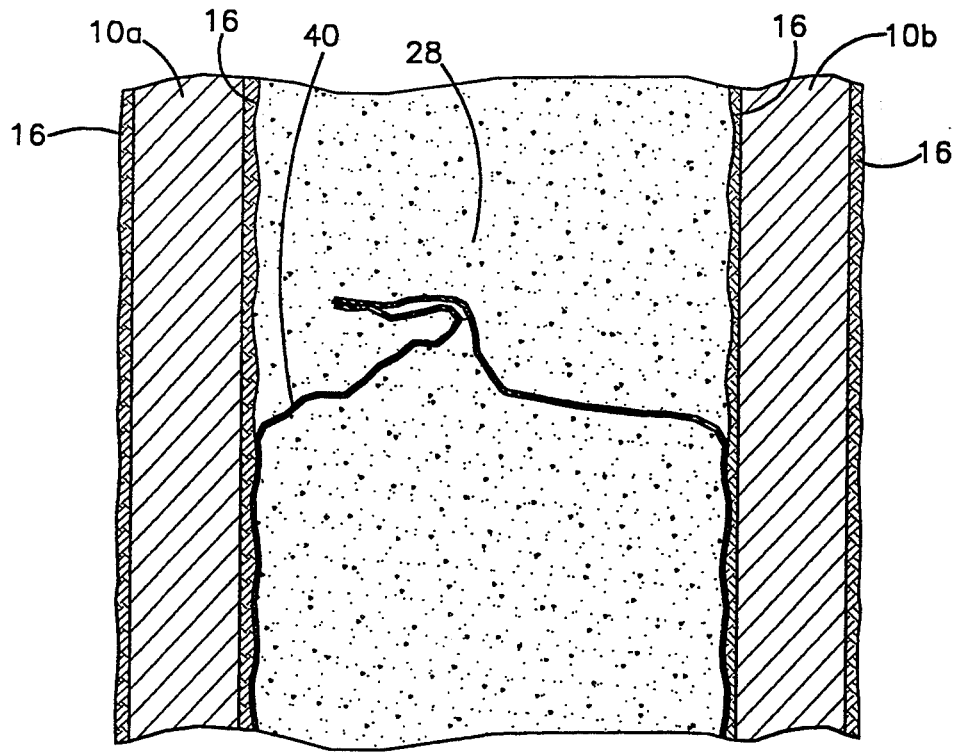
FIG. 6 is a sectional view taken at line 6-6 of FIG. 5, following filling of the flexible bag with the cementitious composition by the method of the present invention.

FIG. 6 is a vertical cross-section, taken at line 6—6 of FIG. 5, following filling the space 12 by the bag 40 and cementitious composition 28. The insulation covering the structural elements is frequently sprayed on, and is lumpy. FIG. 6 shows that the surface of the pre-existing insulation is uneven, and that the bag with its contained cementitious composition expand to fill such spaces, and thereby enable maximum bonding between the cementitious composition and the adjacent structural elements. FIG. 6 shows bag 40 which, after filling according to the preferred embodiment of the present invention, does not quite reach to the next-above floor. The cementitious composition is then pumped on top of the bag until the space is filled to the desired level.

According to the preferred method of the present invention, when the bag 40 and the snorkel 44 have been filled, the snorkel 44 is folded or coiled around on top of the bag 40, and the remaining space between the bag and snorkel and the concrete floor 30 is filled with a segment of cementitious composition, without benefit of the bag 40. It has been found that this small amount of cementitious composition will remain in place without being confined by the bag. Since this segment of the resulting concrete plug 28 directly contacts the insulation 16, this portion of the bond between the concrete plug 28 and the structural member 10 is much stronger than that bonding the remainder of the concrete plug 28 to the structural member 10. The extra-strong bond created by this segment provides additional self-support to the concrete plug, thereby avoiding the weight of the concrete bearing on other, underlying concrete plugs.

FIG. 7 is a perspective view, similar to FIG. 1, following application of the method according to the present invention. As in FIG. 5, FIG. 7 shows that the flexible bag 40 and the composition contained therein expand during filling to entirely fill the available space between the I-bean 10 and the outer wall 20, including expanding laterally outward into the relatively narrow spaces between the outward ends of the I-beam 10 and the adjacent insulation 26.

The cementitious composition of the present invention includes a high proportion of a smooth-surfaced, vesicular, expanded perlite. The smooth-surfaced, vesicular, expanded perlite used in the present invention is from 100 to 30 mesh in size and should have a bulk density of from 3 to 20 pounds per cubic foot (48–320 Kg/m$^3$) and, preferably, from 8 to 15 pounds per cubic foot (128–240 Kg/m$^3$). When the expanded perlite of the invention is sieved, at least about 90% by weight is retained on a U.S. Standard Sieve No. 100, at least about 78% by weight passes through a U.S. Standard Sieve No. 30 and at least about 45% by weight is retained by a U.S. Standard Sieve No. 50. Chemical analysis of this perlite shows a silicon dioxide content of over 70%.

The expanded perlite used in the present method is more fully described in U.S. Pat. No. 5,114,617, the disclosure of which is incorporated herein by reference. The expanded perlite used in the present invention is called MICROLITE®, and is available from SPECRETE-IP, Incorporated, of Cleveland, Ohio.

A key characteristic of the expanded perlite of this invention is that it does not segregate when blended and shipped with other dry materials, and it resists degradation when blended with other materials. This result is in contrast to the performance of other forms of expanded perlite, which tend to segregate and degrade when mixed with other materials.

The outer surface of the expanded perlite used in the cementitious composition of this invention may be treated to have a sealed outer surface. If the perlite is left unsealed, more water penetrates into the interior cavities of the perlite than if it is sealed. The water thus retained by the expanded perlite is beneficial to the curing process.

The expanded perlite used in the cementitious composition is preferably the smooth-surfaced, vesicular expanded perlite as described above. Ordinary open-surface expanded perlite, lacking the smooth surface and vesicular structure of the preferred expanded perlite, may not perform adequately in the presently disclosed composition and method, since such perlite does not share the properties of the preferred expanded perlite. The preferred expanded perlite has a specific gravity of approximately 0.37, whereas open-surfaced expanded perlite has a specific gravity of approximately 0.71. The cementitious composition of the invention preferably contains at least about 10% by weight of the smooth-surfaced, vesicular, expanded perlite as described above, and more preferably this expanded perlite is Microlite ®. The amount of expanded perlite may range up to at least about 20% by weight of the cementitious composition.

The cementitious composition of the invention should comprise the following ingredients within the following approximate range of weights, as shown in TABLE 1. The only limitations within these ranges are that the final cementitious composition preferably has a wet density between 35 and 65 lb/ft$^3$ (560–1280 kg/m$^3$), more preferably has a wet density of 45 lb/ft$^3$ (720 kg/m$^3$), it should be pumpable, and it should be sufficiently thixotropic to be substantially contained within the described flexible bag, while remaining wet enough to wet and bond to any of the pre-existing insulation around structural members.

TABLE 1

| Ingredient | Weight range (lbs) |
| --- | --- |
| Expanded perlite (Microlite ®) | 250–450 |
| Cement | 350–900 |
| Pozzolan | 35–450 |
| Water reducing agent | 0–8 |
| Thixotrope | 0–3 |
| Air entraining agent | 0.5–10 |
| Water | 450–800 |

The individual ingredients listed in TABLE 1 may comprise the following materials. The expanded perlite may be either be sealed or unsealed; the unsealed form is preferred for use in the present invention.

The cement used in the present invention may include standard portland cement of Types I, II, or III, as defined by ASTM C 150, *Standard Specification for Portland Cement*, and equivalents thereof. The preferred cement is Type III early strength portland cement.

The pozzolan used in the present invention may include one or more of Class C fly ash, Class F fly ash, rice hull ash, silica fume, finely ground perlite ore or Santorin earth, and preferably includes one variety of pozzolan which is somewhat water absorbing, such as diatomite. Other known pozzolans may also be used.

In the preferred cementitious composition, the preferred pozzolan is Class C fly ash, as defined by the American Concrete Institute. Fly ash is the finely divided residue resulting from the combination of ground or powdered coal which is transported through the boiler by flue gases. Fly ash occurs in the form of very fine, glassy spheres.

In the preferred cementitious composition, the preferred diatomite is DICALITE ®D4C, which is a natural plasticizing pozzolanic mineral, Type N, conforming to Type U specifications, and is available from Grefco, Inc., Torrance, Calif.

The water reducing agent is used to increase the consistency or strength of a composition, or to decrease the amount of cement required to attain a given result. Surface-active agents are primarily used as water reducing agents, and may include one or more anionic, cationic, nonionic and amphoteric surfactants, with the anionic surfactants being preferred in the composition of the invention. The most preferred water reducing agent is Borem 100, which is a polymerized naphthalene sulfonate formaldehyde condensate, and is available from BOREMCO ®Specialty Chemicals, 106 Ferry Street, Fall River, Mass. 02722.

The thixotropic or thickening agents used in the invention comprise one or more cellulosic compositions such as hydroxymethyl cellulose, hydroxyethyl cellulose, hydroxy propyl methyl cellulose, xanthanum gums, agar gums, and other such known thickening agents. The preferred thixotropic suspending agent is hydroxyethyl cellulose, and the more preferred hydroxyethyl cellulose is CELLOSIZE ®QP 4400H, available from Union Carbide Chemicals & Plastics Co. Inc., P.O. Box 670, Bound Brook, N.J. 08805.

Other thixotropic suspending agents are CARBOPOL 801 sold by B. F. Goodrich of Cleveland, Ohio, and STYMER S sold by Monsanto Chemical Company of St. Louis, Mo., and powdered guar gum type AA, available from Gumix International, Inc. Fort Lee, N.J. 07024. CARBOPOL 801 is a polyacrylic acid powder. STYMER S is a sodium salt of a styrene-maleic anhydride copolymer. Guar gum is derived from the ground endosperm of the guar plant.

The preferred air-entraining agent used in the invention is F-90 foaming surfactant, either alone of in combination with Vinsol Resin NVX 20% neutralized solution. Vinsol is an extract from southern pine stump wood, and is a dark, high-melting, thermoplastic resin which has been reacted with alkalies to neutralize it and produce water soaps. Vinsol is manufactured by the Hercules Powder Company of Wilmington, Del. Other suitable air entraining agents are DARAVAIR and DAREX sold by Grace Concrete Products of Chicago, Ill. These air entraining agents comply with ASTM Designation 260.

The cementitious composition used in the method of the present invention has the following preferred formulation. The preferred formulation is preferably compounded in two sub-formulation batches. At the completion of compounding the major ingredients of the second sub-formulation batch, the first sub-formulation batch is added thereto as if it were another ingredient. This procedure insures that the ingredients are uniformly distributed throughout the combined dry mixture. The first sub-formulation has the preferred formula in a batch shown in TABLE 2.

TABLE 2

FIRST SUB-FORMULATION FOR DRY MIXTURE

| Ingredient | Most Preferred Quantity | Preferred Quantity Range |
|---|---|---|
| Microlite ® | 2.0 lb. | 0.1–4.0 lb. |
| Borem-100 | 3.82 lb. | 2.5–5.5 lb. |
| Cellosize 4400-N | 0.64 lb. | 0.1–2.0 lb. |
| F-90 | 2.55 lb. | 0.5–5.0 lb. |
| NVX Powder | 0.64 lb. | 0.1–3.0 lb. |
| TOTAL WEIGHT: | 9.65 lb. | |

These dry materials are preferably combined together to form the first sub-formulation batch and thoroughly mixed prior subsequent mixing with a batch of the second sub-formulation.

The second sub-formulation includes the preferred ingredients and amounts in the formulation of a batch shown in TABLE 3.

TABLE 3

SECOND SUB-FORMULATION FOR DRY MIXTURE

| Ingredient | Most Preferred Quantity | Preferred Quantity Range |
|---|---|---|
| Microlite ® | 309 lb. | 250–400 lb. |
| C Fly Ash | 170 lb. | 100–200 lb. |
| III Cement | 564 lb. | 450–700 lb. |
| Diatomite | 50 lb. | 20–60 lb. |
| TOTAL WEIGHT: | 1043 lb. | |

The batch of the second sub-formulation is combined and mixed together in a suitable mixing device, following which the batch of the first sub-formulation is added thereto. The combined sub-formulations are thoroughly mixed together to form the final dry mixture. The final dry mixture is preferably packaged in convenient sized packages for shipping and subsequent use.

When it is desired to prepare the cementitious composition for use, the final dry mixture will be transferred to an appropriate mixing device and a quantity of water added as needed to provide a preferred consistency of the cementitious composition thus formed. For a batch of the most preferred formulation prepared as described above, comprising approximately 1052 lb (478 kg) of final dry mixture, approximately 620 lb (282 kg) water would be added to attain the desired consistency of cementitious composition. The exact quantity of water required varies with the particular formulation used, but overall sufficient water should be added when formulating the cementitious composition according to the invention to provide the preferable jelly-like, pumpable, fluid consistency, which is workable in place. Preferably, for every 100 lb. (45 kg) of the preferred formulation of dry cement mixture, approximately 58–60 lb. (26–28 kg) of water will be needed to obtain the preferred consistency.

Expressed in percentages by weight, the cementitious firesafing composition is preferably in approximately the ranges shown in TABLE 4. The ranges

TABLE 4

Preferred Formulation, percent by weight

- 15–25 percent expanded perlite
- 5.9–12.2 percent C fly ash
- 27–42 percent type III portland cement
- 1.2–3.6 percent diatomite
- 0.15–0.33 percent water reducing agent
- 0.006–0.12 percent thixotropic agent
- 0.03–0.6 percent air entraining agent

TABLE 4-continued

Preferred Formulation, percent by weight

32–40 percent water expressed as percentage by weight in TABLE 4 are approximately equivalent to the ranges of weight expressed in pounds shown in TABLES 2 and 3.

The preferred cementitious composition has a long working life. When this cementitious composition cures, it forms a very lightweight concrete having a density less than that of water, being water-repellent, relatively non-absorptive, an excellent thermal insulator, and moderately strong.

The cementitious composition has sufficient wetness and fluidity to thoroughly wet the firesox bag and to contact, wet, and bond to the preexisting insulation 16 and 26 on the I-beams and inner wall surfaces, respectively. The bond thus created helps support the resulting concrete plug 28. the firesox bag 40 is not so permeable, however, that the uncured cementitious composition will leak through it in quantities sufficient to create run-off or puddling around the column bases.

The flexible bag, combined with the fluidity of the cementitious composition, allows the filled firesox bag to surround and bond to any structural member projecting into the space 14 to be filled. By surrounding such members, the firesox bag and cementitious composition derive additional support, so that after curing the weight of a particular concrete plug 28 bears primarily upon the structural members of the floor on which that particular plug was placed, rather than upon the concrete plug on the next-lower building floor.

As an insulator, the concrete formed and placed by the present invention is unsurpassed by any similar concrete or refractory material when tested according to ASTM E 119. In ASTM E 119 a block two feet (61 cm) square and eight inches (20 cm) thick is tested by being placed into the wall of a furnace for three hours. When a block of the concrete of the present invention was tested according to this test, after three hours of exposure, the interior surface temperature was measured at approximately 2000° F. (1093° C.) while the exterior surface of the block was only 85° F. (29° C.). The heat penetration into the block which occurred was sufficient only to create cracks no more than approximately 1.5 inches (3.8 cm) deep. By comparison, the exterior surface of the adjacent masonry refractory material of the furnace was measured at approximately 400° F. (204° C.). Furthermore, the concrete of the present invention retained a stable volume through this entire temperature range, and so did not result in any breaking apart of the concrete. Both the flexible bag and the concrete formed are self-extinguishing if exposed to fire, and is non-corrosive to any metal surfaces to which it comes in contact.

The concrete formed from the cementitious composition of the present invention has a substantial compressive strength compared to other commonly used fireproofing and insulating materials. The concrete formed from the composition of the present invention preferably has a 28-day compressive strength of at least approximately 700 psi (49.2 Kg/cm$^2$). The 28-day compressive strength may range from about 500 to about 1500 psi (35 to 105 Kg/cm$^2$), depending on the formulation of the composition.

The method of the present invention provides for placing the flexible, woven, non-combustible bag 40 through the narrow gap between outer wall 20 and I-beam web 12. The method preferably is performed at each floor, and proceeds successively from a lower floor 32 to subsequent upper floors 30. The thus formed concrete plugs are then preferably separate and distinct from the vertically adjacent plugs. As an alternative embodiment, a concrete plug of more than one floor at a time could be formed, by using a bag long enough to extend through the spaces 14 of several stories, or by taking known measures to connect the distinct plugs at each floor.

As the composition is pumped into each bag 40 and each space 14 becomes filled, the top of the cementitious composition on that particular level of the building provides a base for the next-above bag and associated cementitious composition. Thus, each filled bag may rest partially on the bag just below it. However, due to the inherent flexibility of the bag, it surrounds any projection into the space 14 and binds to the projection. Thus in most cases, and preferably, the concrete plug formed by the present method will be self-supporting, not resting on the next lower plug, but being completely held in place by I-beam 10 and projections into space 14.

The method of the present invention preferably proceeds as follows. The steps of the method begin with a worker on the lower floor and another worker on the next upper floor, with the beam to be treated according to the method of the invention between these floors. The workers are preferably in communication with each other, and the upper-floor workman preferably has a remote television monitor or other means to enable viewing the interior of the space 14 to be filled, so the process can be monitored by the workers.

The first step of the method preferably is placing the bag 40 in the space 14 to be filled. This is accomplished by inserting a weighted line through a gap between the I-beam 10 and the wall 20 at the upper floor 30, and lowering the weighted line to the next lower floor, where the weight is retrieved by the workman at that location, the upper end of the line being retained by the workman at the upper floor 30.

The bottom 42 of the bag 40 is then attached to the upper end of the line or pull wire 46, and the bag 40 is pulled bottom first down through the gap into the space 14 to be filled, until the lower end 42 of the bag 40 just reaches the floor or the top of the concrete plug in the next lower column. FIG. 5 shows a bag 40 in place in the space 14 between the web 12 of the I-beam 10 and the curtain wall 20, prior to the filling step.

The hose 50 is connected to a supply of the cementitious composition. When the bag 40 is properly placed in the space 12 to be filled, the hose 50 is placed into the snorkel portion 44 of the bag and the bag is closed around the end of the hose 50. The cementitious composition is then pumped or allowed to run into the bag 40. As the bag fills it is pressed outwardly by the weight of the composition so as to substantially fill the space 14, contacting substantially all surfaces defining the space, including surfaces projecting into space 14.

The bag, as noted, is woven of a fibrous polymeric or geotextile material. The fibrous material is capable of containing the cementitious composition within the space 14, preventing the composition from leaking out of the space through cracks and gaps, but allowing expansion into substantially all corners and uneven surfaces of the web and the wall. Due to the fact that the material is fibrous, it becomes wetted by the cementitious composition, and thus allows the composition to bond to the surfaces of the web and wall. Such bonding provides substantial or complete support for the concrete plug 28, and avoids the necessity of the concrete plug at each floor bearing the full weight of the concrete plugs in the spaces above it.

When the entire bag 40, including the snorkel 44, is filled, approximately an eight inch segment of space remains at the top of the space 14 to be filled. The filled snorkel 44 is laid on the upper surface of the nascent concrete plug 28. The unfilled segment at the top of the space 14 is at approximately the same level as the concrete floor slab of the upper floor. This segment is filled with a final aliquot of the cementitious composition, but this is without the flexible bag 40. Since this segment is fully in contact with the I-beam 10 and the wall 20, it provides an especially strong bond thereto, and provides additional support to the concrete plug 28.

In the alternative, the bag need not be completely filled. For many purposes in an application such as that contemplated by the preferred embodiment herein, the desired results of the method may be obtained by blocking the conduits with a less than full story-height concrete plug. For example, a partial-height plug would block airflow up the conduit, and would likewise block the flow of heat, smoke and flame from floor to floor, particularly if the partial plug is positioned at the level of the floor 30. Such an embodiment is clearly within the contemplation of the present method.

The cementitious composition is then allowed to cure into the final, hardened concrete plug. The plug provides the desired qualities of thermal insulation and fire resistance, and forms a physical blockage for the vertical conduit. Once the pumping is completed, and the curing begins, the method of the present invention is complete. No further steps are required, no finishing is needed, other than to return any objects, such as interior wall panels, moved in originally gaining access to the columns.

While the invention has been shown and described with respect to particular embodiments thereof, the examples are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A method of fire-proofing and thermally insulating a building by substantially filling structural member voids therein comprising the steps of
    placing at least one conforming containment bag within the void to be filled,
    pumping a cementitious composition containing portland cement and at least 10% by weight of a smooth-surfaced, vesicular, expanded perlite into said containment bag to substantially conform said containment bag to said structural member adjacent said void and to substantially fill said void with said cementitious composition, and
    allowing said cementitious composition to cure to a substantially hardened state.

2. A method as in claim 1, wherein said expanded perlite is present in said cementitious composition in an amount in the range of about 10% to about 20% by weight.

3. A method as claimed in claim 1, wherein said expanded perlite has a particle size in the range of 100 to 30 mesh.

4. A method as claimed in claim 1 wherein said containment means is a flexible fibrous polyamide bag.

5. A method as claimed in claim 4, wherein said bag is of woven construction and substantially contains said cementitious composition, which composition wets the outer surface of the bag, said composition becoming at least partially bonded to said structural member upon curing.

6. A method as claimed in claim 5, wherein said bag is non-flammable and non-combustible.

7. A method as claimed in claim 5, wherein said bag is made of a geotextile material.

8. A method of thermally insulating and making fire-resistant a structure by disposing a material within portions of structural members of the structure, comprising the steps of placing at least one conformable containment bag adjacent the portions of the structural member to be protected, pumping a cementitious composition into said containment bag, said composition being curable into a refractory insulating concrete and containing portland cement and at least about 10% by weight of a smooth-surfaced, vesicular, expanded perlite, filling said containment bag, said filled containment bag substantially conforming to and substantially filling the portion of the structural member, and allowing said cementitious composition to cure to a substantially hardened, refractory insulating state.

9. A method as claimed in claim 8 wherein said containment bag is a flexible nylon bag.

10. A method as claimed in claim 8, wherein said bag is woven and substantially contains said cementitious composition, which composition wets the outer surface of the bag, said composition becoming at least partially bonded to said structural member upon curing.

11. A method as claimed in claim 9, wherein said bag is non-flammable and non-combustible.

12. A method as claimed in claim 8, wherein said bag is made from a geotextile material.

13. A method as claimed in claim 8, wherein said expanded perlite aggregate is present in said cementitious composition in an amount in the range of 10% to 20% by weight.

14. A method as claimed in claim 8 wherein said expanded perlite aggregate has a particle size substantially in the range of 100 to 30 mesh.

* * * * *